United States Patent Office 3,563,980
Patented Feb. 16, 1971

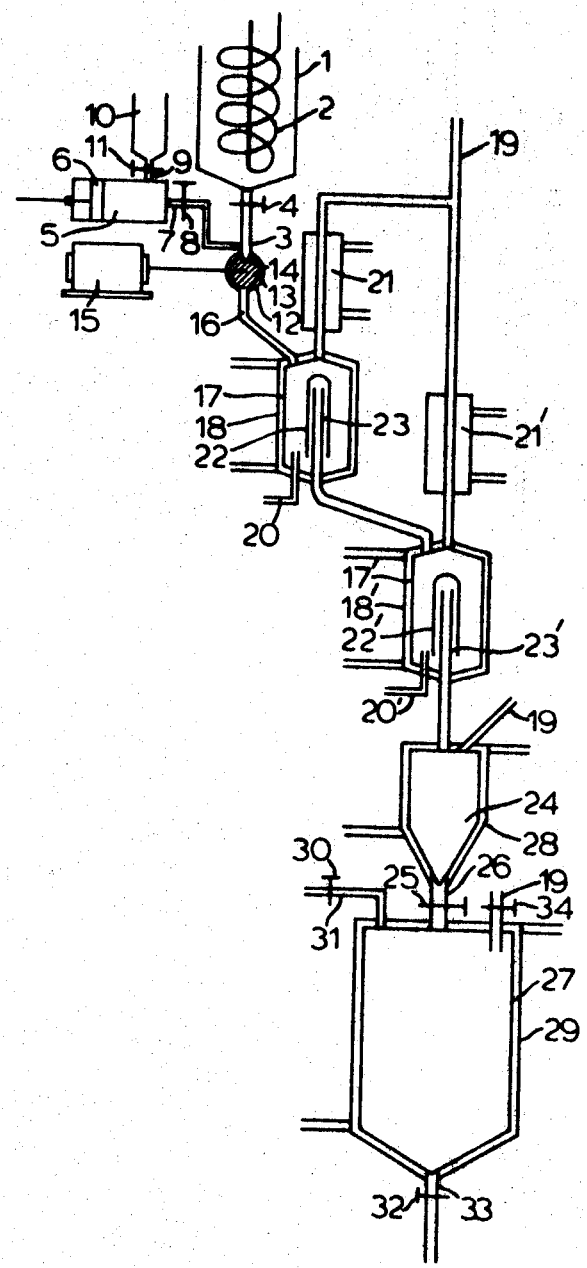

3,563,980
PROCESS OF PREPARING A MIXTURE OF A LACTAM AND AN ALKALI COMPOUND OF THIS LACTAM
Johannes van Mourik, Geleen, Johannes van Beveren, Sittard, and Johannes J. de Dilva, Heerlen, Netherlands, assignors to Stamicarbon N.V., Heerlen, Netherlands
Filed Apr. 5, 1968, Ser. No. 719,043
Claims priority, application Netherlands, Apr. 5, 1967, 6704865
Int. Cl. C07d 41/08
U.S. Cl. 260—239.3         3 Claims

ABSTRACT OF THE DISCLOSURE

Process and apparatus for preparing a catalyst for the anionic polymerization of lactams, in which a lactam and an alkali metal hydroxide are continuously fed into a first reaction vessel, the liquid level in said vessel being kept constant by feeding a portion of the reatcion mixture into a second vessel and the liquid level in said second vessel being kept constant by discharging a continuous stream of the reaction mixture from said vessel. The water formed in the reaction vessels is evaporated by heating in vacuo and the vapour thus formed is passed through a condenser in which the lactam is condensed and returned to the reaction vessels.

---

The present invention relates to a process of preparing a mixture of a lactam and an alkali compound of this lactam serving as a catalyst for the anionic polymerization of lactams, by reacting a hydroxide of an alkali metal with a molten lactam, and evaporating the water formed in this reaction by heating in vacuo.

In the anionic polymerization of lactams, anhydrous lactams are polymerized with small amounts of alkali lactams to form polyamides. The polymerization can be effected with or without the presence of an accelerator, e.g. dicaprolactam ether.

This alkali lactam can be made to be formed in situ by adding an alkali metal or an alkali metal compound, e.g. a hydroxide, to the molten lactam to be polymerized. However, it is preferable to prepare the catalyst in a separate reaction vessel and subsequently to supply it to the polymerization vessel, previously dissolved in lactam, in most cases.

In practice the use of free alkali metals is unattractive. The application of alkali metal hydroxides, however, entails the drawback that in the reaction with the lactam water is formed, which has then to be removed quickly to avoid the occurrence of side reactions that may give rise to the formation of substances weakening the activity of the resulting catalyst. For instance, if the water formed is not removed quickly and thoroughly enough, the use of sodium hydroxide will result in the formation of the sodium salt of aminocaproic acid as an unwanted by-product. This salt is not sufficiently basic to catalyze the polymerization, and hinders the polymerization through aminolysis of acyl lactams, which play a major part in the polymerization mechanism.

In order to suppress the formation of these undesirable by-products as much as possible, the water formed is, in the known method, quickly removed by heating the reaction product in vacuo and passing through an inert gas, e.g. nitrogen. In the process a considerable amount of lactam is removed in the vapour phase. Moreover, if this method is applied only small amounts of catalyst can be prepared discontinuously, since otherwise it would be impossible to remove all of the water formed so quickly as to prevent the formation of the unwanted by-products.

The invention provides a process by which it is possible to prepare, in a continuous process, a practically water-free alkali metal compound of lactam while avoiding the formation of disturbing amounts of unwanted by-products, in which process hardly any lactam is removed in the vapour phase.

This has been achieved in that, according to the invention, lactam and alkali metal hydroxide are continuously fed into a reaction vessel, and the vapour removed from this vessel is passed through a condenser the temperature in which is maintained at such a value that the lactam present in the vapour, but little or no water vapour, condenses and flows back into the reaction vessel, while so much of the reaction mixture is continuously fed from this reaction vessel into a second reaction vessel that in the first vessel an almost constant liquid level is maintained, after which the vapour leaving the second reaction vessel is passed through a condenser the temperature in which is likewise maintained at such a value that the lactam carried off, but little or none of the water vapour condenses and flows back into either of the reaction vessels, from which second reaction vessel so much of the reaction mixture is discharged in a continuous stream that an almost constant liquid level is maintained in this vessel.

Since the reaction and the isolation of the water are effected stepwise, the water concentration in each stage is decreased to such an extent that unwanted side reactions do not occur to any notable degree, even if large amounts of catalyst are being prepared. This renders possible the continuous preparation of a solution containing the catalyst, with the reaction mixture retained in the equipment for a short time only. Owing to the water concentration being lower, such an equilibrium will be established in each stage that the amount of alkali metal hydroxide converted is maximum, and eventually in the last stage, an almost complete conversion of this hydroxide is achieved.

As, in the process according to the invention, the discharged vapour is passed through a condenser the condensate from which is returned to the reactor, the amount of lactam discharged is small. On the other hand, part of the water, e.g. 2–5% is not removed. However, removal of the greater part of the water is again effected in the following stage, so that eventually a virtually water-free reaction product remains. Although, as a rule, two stages will suffice, it is also possible to use more stages, should this be desired.

The temperature at which the condensation of the vapour discharged from a reactor is effected is below the boiling point of the lactam at a given pressure in the condenser. This pressure, which is practically equal to the pressure inside the reactor, is generally 1–20 mm. Hg, depending on the type of vacuum pump used. In conjunction with this, the temperature in the condenser during the processing of caprolactam is 75–100° C., corresponding to a caprolactam vapour pressure at these temperatures of 0.4–1.8 mm. Hg. The temperature in the reactor should be higher and, at a pressure of 1–20 mm. Hg, is usually maintained at 90–150° C.

The invention renders it possible to supply the alkali metal hydroxide as an aqueous solution. This brings the advantage that the hydroxide can be supplied continuously and at a constant rate by means of a simple pump. In the known processes the application of such aqueous solutions is attended with the drawback that, in addition to the water formed in the reaction, an additional amount of water is introduced into the reactor from outside, which amount cannot be adequately removed. In the process according to the invention, however, this additional amount is removed effectively and rapidly.

The invention will be further explained with reference to the drawing, which is a diagram representing equipment for realizing the process according to the invention.

A storage vessel 1 contains caprolactam, which is maintained in the molten state by means of steam passed through a heating spiral 2 mounted in the vessel. At the bottom, the vessel has a discharge conduit 3, and a valve 4, which in normal operation is open.

In a cylinder 5 there is an aqueous solution of potassium hydroxide. The weight percentage of potassium hydroxide in this solution is, say, 50%. The cylinder is fitted with a piston 6, which, by a drive mechanism not shown in the drawing, can be moved forward at a uniform rate. The solution present in the cylinder is thus forced into the bottom part of conduit 3, through a conduit 7. Conduit 7 is equipment with a valve 8, which in normal operation is open. The cylinder is further connected, through a conduit 9, with a storage tank 10 for the potassium hydroxide solution. In normal operation, conduit 9 is closed by a valve 11.

When the piston 6 has reached the end of its stroke, valve 8 is closed and valve 11 opened. The piston is subsequently retracted to its original position by the drive mechanism, so that the cylinder is refilled with potassium hydroxide solution from tank 10. Thereafter, valve 11 is closed again and valve 8 opened, so that the supply of potassium hydroxide solution to conduit 3 can be resumed. The pump can be made double, so that, while the cylinder of one pump is being filled, the other pump forces the hydroxide solution into conduit 3. Naturally, also other types of pump may be used, e.g. a geared pump, which can continuously transport a solution at a predetermined constant rate.

At its bottom conduit 3 is connected to a portioning device, which, in the embodiment shown in the drawing, consists of a rotatable cylinder 13 fitting in a cylindrical casing 12, the cylinder having one or more recesses 14 along its circumference. The cylinder is rotated by a motor 15. Every time a recess is directly under the mouth of conduit 3, this recess is filled with a mixture of caprolactam and potassium hydroxide solution. On continuing its rotation the cylinder reaches a position in which the mouth of conduit 3 is closed and the recess is at the bottom of the portioning device. The mixture will then flow through an opening in the casing 12 into a conduit 16, and on into a reactor 17. Since the hydroxide solution has a higher specific gravity than caprolactam, the solution supplied through conduit 3 will immediately flow into the recess, and the caprolactam will further fill this recess. As the hydroxide solution and the caprolactam do not come into contact with each other until immediately before portioning is effected, no hydrolysis will occur in conduit 3.

The speed of the motor 15, the capacity of the pump 5, 6 and the dimensions of the recess(es) 14 have been chosen to ensure that the portioning device will draw from conduit 3 the correct amount of a mixture of the desired composition, to deliver this to reactor 17. Naturally, it is also possible to use other portioning devices, for instance sluice valves, control valves, etc.

Reactor 17 is equipped with a jacket 18, through which oil having a temperature of 155° C. is passed. In the reactor, the potassium hydroxide reacts with the caprolactam according to the equation

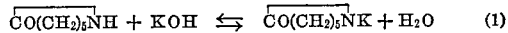

$$\overline{CO(CH_2)_5NH} + KOH \rightleftarrows \overline{CO(CH_2)_5NK} + H_2O \qquad (1)$$

The water present in the mixture supplied to the reactor, as well as the water formed in reaction (1), has to be removed as quickly and thoroughly as possible, in order to shift the reaction equilibrium towards the right and to prevent the resulting potassium salt of caprolactam from reacting with the water according to the equation

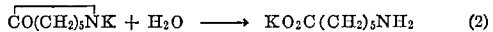

$$\overline{CO(CH_2)_5NK} + H_2O \longrightarrow KO_2C(CH_2)_5NH_2 \qquad (2)$$

The potassium salt of aminocaproic acid formed in this reaction has a retarding effect on the polymerization process to be carried out with the aid of the catalyst, so that it has to be seen so that the presence of disturbing amounts of this salt in the catalyst to be prepared is avoided.

The water present in the reaction mixture evaporates at the temperature prevailing in the reactor. In order that the resulting water vapour may be quickly removed from the mixture, the reactor is connected to a vacuum line 19, in which a pressure of, say, 10 mm. Hg prevails, and a small stream of nitrogen is passed through the reactor via a conduit 20.

The pressure and temperature prevailing in the reactor will cause also part of the caprolactam to vaporize and to leave the reactor together with the water vapour and with the nitrogen supplied. In order to recover this lactam, the vapour discharged from the reactor is passed through a condenser 21. Water or oil having a temperature of 100° C. is circulated through this condenser, so that by far the greater part of the caprolactam present in the vapour will condense and flow back into the reactor. If so desired, a low-temperature cooler may be built into the vacuum line for the complete recovery of the caprolactam not separated out in the condenser. The temperature in the condenser must be kept above the melting point of caprolactam (69° C.), to avoid clogging by solidified caprolactam.

In the embodiment shown in the drawing, a bell 22 is provided in reactor 17. The reaction mixture fed in flows down through the annular space between the bell and the inner wall of the reactor, and then up inside the bell, after which it flows to a following reactor 17' through a downpipe 23 extending into the bell.

The liquid level in the reactor is determined by the height of the downpipe section extending into the bell.

In reactor 17 nearly all of the water present in the potassium hydroxide solution, as well as the water generated in the formation of potassium caprolactam is removed. The volume of the reactor has so been chosen with respect to the amount of mixture fed in that the mean time for which the mixture remains in the reactor is only about 5–20 minutes.

The mixture fed into reactor 17' is practically water-free. In this reactor the remaining portion of the potassium hydroxide reacts with the caprolactam. The design of reactor 17' and condenser 21' is identical to that of reactor 17 and condenser 21 of the first stage. Equipment items in the second stage which correspond to items in the first are designated in the drawing by like reference figures, but distinguished from the first-stage items by the addition of a prime to the figures.

The reaction product discharged through downpipe 23' consists of a practically water-free mixture of caprolactam and potassium caprolactam. All, or nearly all, of the potassium hydroxide has been converted to potassium caprolactam, so that the mixture discharged from the second reactor cannot give a reaction producing water. Naturally, a third stage may follow in the series, should this be deemed desirable. The reaction product discharged through downpipe 23' is fed into a buffer vessel 24, from which it can be passed into a storage tank 27 through a conduit 26, which can be shut off by means of a valve 25. The buffer vessel 24 and the storage tank 27 are enveloped by jackets 28 and 29, respectively, through which oil is passed at a temperature of 100° C., so that the solution present in these vessels—which contains 0.1–10 moles percent, preferably 1–4 moles percent of potassium caprolactam—remains in the liquid form.

The buffer vessel and the storage tank are both connected to a vacuum line 19. Via a conduit 31, which can be shut off by a valve 30, the storage tank is further connected to a space containing an inert gas at atmospheric pressure. In the bottom of the storage tank there is a discharge conduit 33, which can be closed by means of a valve 32.

When the contents of the buffer vessel have to be transferred to the storage tank, valve 30 is closed and valve 34 in the vacuum line opened, so that a subatmospheric pressure is created in the storage tank. Next, valve 25 in the conduit connecting the two vessels is opened. After the contents have been transferred, valves 25 and 34 are closed again and valve 30 is opened. Valve 32 can now be opened to discharge catalyst solution from the storage tank.

The invention is not restricted to the embodiment described above. Various modifications can be made in this embodiment without departing from the invention. For instance, reactors 17 and 17' may be connected to a common condenser. Also, the successive stages may be connected by means of control valves which allow so much of the product to pass that the liquid level in the preceding reactor is kept constant.

As alkali metal hydroxides may be used the hydroxides of sodium and potassium, as well as those of the more expensive alkali metals lithium, rubidium and cesium. These hydroxides can be supplied in the solid state or as an aqueous solution.

The starting product may be any of various ω-lactams, for instance butyrolactam, valerolactam, caprolactam, oenantholactam, capryl lactam, decanolactam, undecanolactam, laurinolactam, pentadecanolactam, hexadecanolactam, methyl caprolactam, cyclic hexamethylene adipamide, etc., as well as mixtures of these substances. The alkali metal lactams of these compounds obtained by the use of the invention can be used, in amounts of 0.1–10 moles percent as catalysts in the anionic polymerization of each of the abovementioned lactams.

EXAMPLE

Reactor 19 is supplied hourly with 3 kg. of ε-caprolactam, 22 g. of potassium hydroxide in 25 ml. of water, and 30 litres of nitrogen.

The temperature in the reactors is about 130° C., the pressure appr. 12 mm. Hg. The reaction conditions prevailing in the two reactors are equal.

Each of the reactors contains 500 g. of the reaction mixture, so that the mean residence time in the reactor is $$\frac{500}{3000} \times 60 = 10 \text{ minutes}$$

In the condensers the vapour mixture discharged from the reactors is cooled to 90° C.

The reaction product discharged from the second reaction vessel no longer contains potassium hydroxide, but consists of a solution of alkali lactam in caprolactam, plus a negligible amount of water. The yield of reaction product is 3000 g./h., containing 1.5 moles percent of potassium caprolactam.

After addition of 0.6 mole percent of dicaprolactam ether a fully polymerized product is obtained at 150° C. after only 12 minutes if this reaction product is used in the polymerization.

What is claimed is:

1. A process for preparing a mixture of a lactam and an alkali metal compound of this lactam serving as a catalyst for the anionic polymerization of lactams, by reacting an hydroxide of an alkali metal with a molten lactam and evaporating the water formed in this reaction by heating in vacuo, this process being characterized by the following combination of steps:
    (a) continuously feeding both a molten lactam chosen from a group consisting of butyrolactam, valerolactam, caprolactam, oenantholactam, capryl lactam, decanolactam, undecanolactam, laurinolactam, pentadecanolactam, hexadecanolactam, methyl caprolactam, cyclic hexamethylene adipamide and mixtures thereof, and alkali metal hydroxide into a first reaction vessel;
    (b) removing vapor containing lactam and water from the first reaction vessel;
    (c) condensing lactam but little or no water from the removed vapor and returning the condensate to the first reaction vessel;
    (d) conducting sufficient reaction mixture from the first reaction vessel to a second reaction vessel to maintain a substantially constant liquid level in the first reaction vessel;
    (e) removing vapor containing lactam and water from the second reaction vessel;
    (f) condensing lactam but little or no water from the removed vapor and returning the condensate to at least one of the first reaction vessel and the second reaction vessel; and
    (g) discharging sufficient reaction mixture from the second reaction vessel to maintain a substantially constant liquid level in the second reaction vessel.

2. A process for preparing a mixture of a lactam and an alkali metal compound of this lactam serving as a catalyst for the anionic polymerization of lactams, by reacting an hydroxide of an alkali metal with a molten lactam and evaporating the water formed in this reaction by heating in vacuo, this process being characterized by the following combination of steps:
    (a) continuously feeding both a molten caprolactam, and alkali metal hydroxide into a first reaction vessel;
    (b) removing vapor containing lactam and water from the first reaction vessel;
    (c) condensing lactam but little or no water from the removed vapor and returning the condensate to the first reaction vessel;
    (d) conducting sufficient reaction mixture from the first reaction vessel to a second reaction vessel to maintain a substantially constant liquid level in the first reaction vessel;
    (e) removing vapor containing lactam and water from the second reaction vessel;
    (f) condensing lactam but little or no water from the removed vapor and returning the condensate to at least one of the first reaction vessel and the second reaction vessel; and
    (g) discharging sufficient reaction mixture from the second reaction vessel to maintain a substantially constant liquid level in the second reaction vessel.

3. Process according to claim 1, characterized in that the alkali metal hydroxide is supplied as an aqueous solution.

References Cited

UNITED STATES PATENTS

| 2,638,463 | 5/1953 | Ney et al. | 260—78L |
| 2,739,959 | 3/1956 | Ney et al. | 260—78L |
| 3,216,976 | 11/1965 | Schwartz et al. | 260—78L |

NORMA S. MILESTONE, Primary Examiner

R. T. BOND, Assistant Examiner

U.S. Cl. X.R.

260—294.7, 326.5, 78; 252—430, 431